US009070516B2

(12) United States Patent
Yamada et al.

(10) Patent No.: US 9,070,516 B2
(45) Date of Patent: Jun. 30, 2015

(54) ELECTRIC DOUBLE-LAYER CAPACITOR

(75) Inventors: Masahiro Yamada, Kobe (JP); Yukito Imamura, Kobe (JP); Toru Morita, Kobe (JP); Tadashi Anada, Kobe (JP); Masamichi Maruyama, Nishinomiya (JP); Noriaki Takakura, Nishinomiya (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 150 days.

(21) Appl. No.: 13/881,951

(22) PCT Filed: Oct. 25, 2011

(86) PCT No.: PCT/JP2011/074554
§ 371 (c)(1),
(2), (4) Date: Jun. 25, 2013

(87) PCT Pub. No.: WO2012/063640
PCT Pub. Date: May 18, 2012

(65) Prior Publication Data
US 2013/0271893 A1    Oct. 17, 2013

(30) Foreign Application Priority Data
Nov. 8, 2010 (JP) ................................ 2010-250124

(51) Int. Cl.
*H01G 9/00* (2006.01)
*H01G 11/74* (2013.01)
*H01G 11/78* (2013.01)

(52) U.S. Cl.
CPC ............... *H01G 11/74* (2013.01); *H01G 11/78* (2013.01); *Y02T 10/7022* (2013.01); *Y02E 60/13* (2013.01)

(58) Field of Classification Search
USPC .................................. 361/502–504, 509–512
See application file for complete search history.

(56) References Cited

U.S. PATENT DOCUMENTS 5,859,761 A    1/1999 Aoki et al.
5,959,830 A *  9/1999 Inagawa et al. ............... 361/502

(Continued)

FOREIGN PATENT DOCUMENTS

JP    U-3-83931    8/1991
JP    A-11-074148  3/1999

(Continued)

OTHER PUBLICATIONS

Jan. 31, 2012 International Search Report issued in International Application No. PCT/JP2011/074554 with English-language translation.

*Primary Examiner* — Nguyen T Ha
(74) *Attorney, Agent, or Firm* — Oliff PLC

(57) ABSTRACT

An electric double-layer capacitor, which provides enhanced heat release-ability with a simple configuration ensuring vibration resistance and impact resistance and to improve durability in a severe marginal environment, is provided. The electric double-layer capacitor includes capacitor cells; a pair of end plates, respectively disposed on both sides of a plurality of parallelly arranged capacitor cells; a metallic case for housing the end plates, a plurality of capacitor cells; and an insulating resin, filling the interior of the metallic case to cover the end plates, a plurality of capacitor cells and lead terminals, wherein the electric double-layer capacitor further includes an external connecting terminal having two end sections, one of the end sections being disposed in the end plate within the insulating resin, and wherein the lead terminal of the capacitor cell disposed adjacent to the end plate is configured to be connected to the one of the end sections of the external connecting terminal.

9 Claims, 6 Drawing Sheets

(56) References Cited

U.S. PATENT DOCUMENTS

| | | |
|---|---|---|
| 2005/0168918 A1 | 8/2005 | Araki et al. |
| 2009/0147441 A1 | 6/2009 | Yoshida et al. |
| 2010/0039748 A1 | 2/2010 | Fujii et al. |

FOREIGN PATENT DOCUMENTS

| | | | |
|---|---|---|---|
| JP | A-2000-216068 | | 8/2000 |
| JP | A-2003-162989 | | 6/2003 |
| JP | 02003272973 | * | 9/2003 |
| JP | A-2003-272974 | | 9/2003 |
| JP | A-2006-245442 | | 9/2006 |
| JP | A-2006-324350 | | 11/2006 |
| JP | A-2010-182990 | | 8/2010 |
| JP | A-2010-186786 | | 8/2010 |
| WO | WO 2006/025306 A1 | | 3/2006 |
| WO | WO 2008/108089 A1 | | 9/2008 |

* cited by examiner

ELECTRIC DOUBLE-LAYER CAPACITOR

TECHNICAL FIELD

The present invention relates to an electric double-layer capacitor having a capacitor cell, in which a positive electrode and a negative electrode, and a separator interposed therebetween, are housed in an exterior case together with an electrolytic solution.

BACKGROUND ART

Conventionally, an electric double-layer capacitor is employed as an electric capacitor with a large capacity and high energy in electric power applications and the like. Many of the electric double-layer capacitors include capacitor cells, in each of which a positive electrode and a negative electrode, and a separator interposed therebetween, are housed in an exterior case (for example, aluminum laminate case or the like) together with an electrolytic solution. The capacitor cell ordinarily has a configuration, in which a positive electrode terminal and a negative electrode terminal are drawn from a sealed section of the exterior case. Since an output voltage of a single capacitor cell itself is low that is around several volts (V), the capacitor cells are typically utilized as a capacitor module, in which terminals of a plurality of capacitor cells are connected according to a series connection, a parallel connection, or a series-parallel connection containing the series connection and the parallel connection coexisting therein, in order to obtain a desired output performance (for example, see Patent Literature 1).

CITATION LIST

Patent Literature

Patent Literature 1: Japanese Patent No. 3848190.

SUMMARY OF INVENTION

Technical Problem

Meanwhile, the electric double-layer capacitor is employed in various applications, such as an application of electricity storage for regenerating energy of electric motor vehicle and the like, as this achieves a boosting charge with a large capacity, or an application of compensation for power source, as this achieves a momentary discharge, and thus durability for the use in more severe peripheral environments such as, for example, environments subjected to high ambient temperature, heavy vibration or heavy impact, is required.

Thus, in the conventional technology, a heat sink plate may be interposed between capacitor cells or a heat exchanger that circulates a medium used as a cooling medium (liquid or gas) may be disposed in the case where a plurality of capacitor cells are arranged to be housed in the capacitor case, in order to prevent deterioration by the heat of the capacitor cells. However, this increases the size of the capacitor module since the parts for the heat-releasing is disposed within the capacitor case, which inevitably causes the decrease in the mechanical strength and the increases in the installation space and the weight, and also, it is not easy to inhibit vibrations or impacts exerted over the capacitor cell through the module case, and further, it is difficult to improve the durability of the capacitor cell.

While there is also a method for providing a heat transfer frame in an outer circumference of an exterior case in each of capacitor cells to ensure a heat-releasing effect of the capacitor cell and a support strength of the cell as described in Patent Literature 1, this method requires mounting heat transfer frames for the respective cells so that the operation for assembling the module becomes complicated, and in addition, this method provides no countermeasure for the lead terminal of the capacitor cell except for only supporting the exterior case of the capacitor cell, and therefore vibration resistance and impact resistance for a coupling section between the lead terminals or a coupling section between the lead terminal and the external connection terminal cannot be ensured.

Thus, an object of the present invention is to provide an electric double-layer capacitor, which is capable of eliminating the above-described defects to provide enhanced heat release-ability with a simple configuration and to ensure vibration resistance and impact resistance and to improve durability in a severe marginal environment.

Solution to Problem

In order to solve the above-described problem, an electric double-layer capacitor 1 of the present invention is configured to comprise capacitor cells 10, in each of which a positive electrode and a negative electrode, and a separator interposed therebetween, are housed in an exterior case 11 that is filled with an electrolytic solution, and lead terminals 12, 12 connected to the positive electrode and the negative electrode, respectively, are drawn to the outside of the exterior case 11; a pair of end plates 3, 3, respectively disposed on both sides of a plurality of parallelly arranged capacitor cells 10; a metallic case 6 for housing the end plates 3, 3 and a plurality of capacitor cells 10; and an insulating resin 7, filling the interior of the metallic case 6 to cover the end plates 3. 3, the plurality of capacitor cells 10 and the lead terminals 12, wherein the electric double-layer capacitor further comprises an external connecting terminal 5 having two end sections, one of the end sections being disposed in the end plate 3 within the insulating resin 7, and the other of the end sections protruding from the insulating resin 7 toward the outside thereof, and wherein the lead terminal 12 of the capacitor cell 10 disposed adjacent to the end plate 3 is configured to be connected to the one of the end sections of the external connecting terminal 5 and be fixed to the end plate 3.

Also, the exterior case 11 includes a discharge valve 13 for discharging a gas generated in the inside of the capacitor cell 10 to the outside thereof, and wherein the insulating resin 7 fills the inside of the metallic case 6 so as to form a discharge path 8 for communicating the discharge valve 13 to the outside thereof.

Further, the discharge path 8 is composed of a tubular member 20 provided so as to face the discharge valve 13.

Furthermore, a control board 21 for controlling voltage of each of the capacitor cells 10 is provided above the insulating resin 7 in the side of an opening section 6a of the metallic case 6.

Also, a spacer 9, which is in contact with the inside of the metallic case 6, is provided.

Advantageous Effects of Invention

According to the electric double-layer capacitor of the present invention, since the capacitor cells, the end plates and one end section of the external connecting terminal housed in the metallic case are covered with the insulating resin, that is, the respective members housed in the metallic case are in the state of being supported with the insulating resin, the capacitor cells, the end plates, the external connecting terminals, the insulating resin, and the metallic case exhibit substantially equivalent behaviors when a vibration or an impact is exerted from the outside, in other words, a state in which relative movements among each of the members are substantially restricted is attained, and therefore collisions among the members can be prevented. Also, since the connecting section between the lead terminals and the connecting section between the lead terminal and the external connecting terminal are covered with the insulating resin, these exhibit behaviors that are substantially equivalent to other members, and therefore failures caused by the vibration and the impact can be prevented. As described above, certain levels of the vibration resistance and the impact resistance can be ensured with a simple configuration for simply filling with the insulating resin. Also, since heat generated from the capacitor cells is transmitted to the surface of the insulating resin surface the metallic case through the insulating resin to be released to the outside, enhanced heat release-ability can be achieved.

Also, the discharge valve is provided and filling with the insulating resin is carried out so as to form the discharge path communicating the discharge valve to the outside, so that the protection with the insulating resin can be achieved while preventing the failure of the capacitor cell occurred by the increased internal-pressure to ensure the vibration resistance and the impact resistance.

Further, the discharge path is formed by employing the tubular member to achieve easy operation for charging the insulating resin.

Furthermore, since the control board is disposed above the insulating resin, the members such as the capacitor cells and the like exhibit substantially equivalent behaviors with the behavior of the control board, so that it is difficult to exert a vibration or an impact over the wires for connecting the capacitor cells to the control board or the like to ensure the vibration resistance and the impact resistance.

Also, since the spacer that is in contact with the inside of the metallic case is provided, the insulating resin layer would be firmly formed between the metallic case and the members such as the capacitor cells and the like, and therefore the vibration resistance, the impact resistance and the heat release-ability achieved by the insulating resin are ensured. Also, since the aligning of the capacitor cells in the metallic case is facilitated, the assembly operation also becomes facilitated.

DESCRIPTION OF EMBODIMENTS

Figure 1:
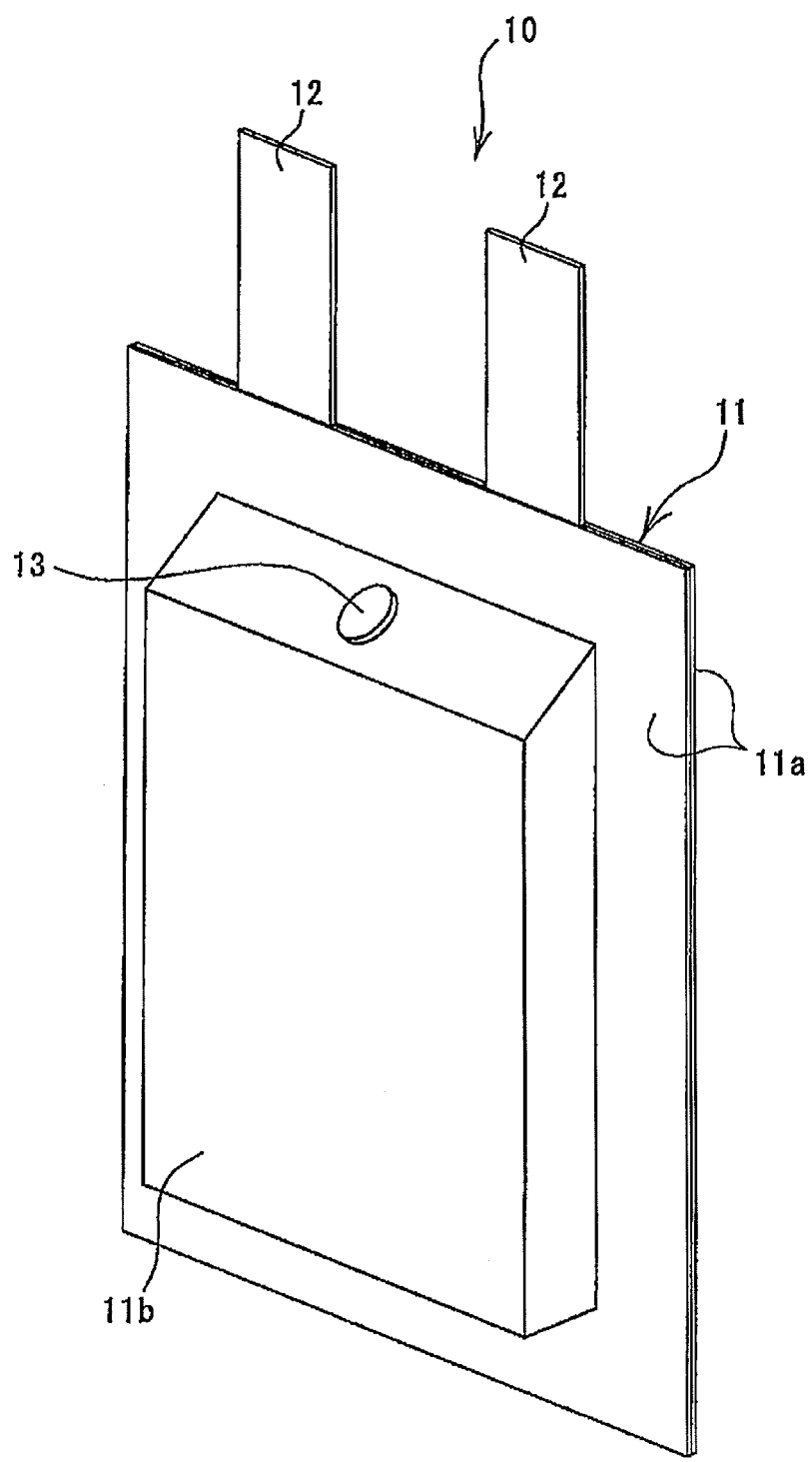
FIG. 1 is a perspective view, showing a capacitor cell of an electric double-layer capacitor according to an embodiment of the present invention.

An embodiment of the electric double-layer capacitor according to the present invention will be described in detail on the basis of the annexed figured. An electric double-layer capacitor 1 of the present invention comprises a capacitor module 2 composed of a plurality of capacitor cells 10 shown in FIG. 1, which are connected via the series connection, in order to obtain the desired output. In addition to above, the capacitor module 2 is not limited to the configuration for connecting a plurality of capacitor cells 10 according to the series connection, and may alternatively be formed according to the parallel connection, or a series-parallel connection containing the series connection and the parallel connection coexisting therein.

The capacitor cell 10 has the configuration, in which the positive electrode and the negative electrode are housed in the exterior case 11 in the state in which both electrodes are stacked via the separator interposed therebetween, and the exterior case 11 is filled with an electrolytic solution, and further, lead terminals 12 and 12, which are connected to the positive electrode and the negative electrode, respectively, are drawn toward the outside of the exterior case 11.

More specifically, each of the positive electrode and the negative electrode is, for example, composed of a foil of a metal such as aluminum and the like that is directly coated with activated carbon, and for example, an alternate stack of different electrodes is formed in the state in which a separator composed of an insulator such as a resin and the like is interposed between the electrodes, such that the positive electrode and the negative electrode and the separator are integrally formed. Also, one end sections of the strip-shaped lead terminals 12 and 12 for forming connection to an electrical equipment are connected to the positive electrode and the negative electrode, respectively, and the respective other end sections of the lead terminals 12 and 12 are drawn to the outside of the exterior case 11.

The exterior case 11 is made of a laminate aluminum foil 11a, which is formed of; for example, a metallic foil of aluminum sandwiched between plastic films, and one of flat laminate aluminum foils 11a is oriented so as to faces the other of the laminate aluminum foils 11a having a recessed section (housing portion) 11b formed in the substantially central portion thereof, which is capable of housing the positive electrode, the negative electrode and the separator, and the circumference sections of both the laminate aluminum foils 11a and 11a surrounding the housing portion 11b are joined via a thermal fusion bonding and the like to seal the interior space thereof. In addition to above, it is not limited to employ the laminate aluminum foil 11a for the exterior case 11, and various types of materials may alternatively be employed to form the exterior case. Also, the laminate aluminum foil 11a may be alternatively be formed by employing various types of joining methods such as adhesion with an adhesive agent and the like, and not limited to employing the thermal fusion bonding. Also, both of the laminate aluminum foils 11a, 11a may be provided with the housing portions 11b, respectively.

Also, a gas discharge valve 13 for discharging a decomposition gas (for example, gases such as carbon monoxide, carbon dioxide and the like), which is generated by the electrolysis and the like of the electrolytic solution, is provided above the housing portion 11b in the exterior case 11 to discharge such a decomposition gas to the outside of the exterior case 11. In addition to above, various types of known valves may be employed for the gas discharge valve 13, as long as the valve serves as preventing the increase in the internal pressure of the exterior case 11.

Figure 2:
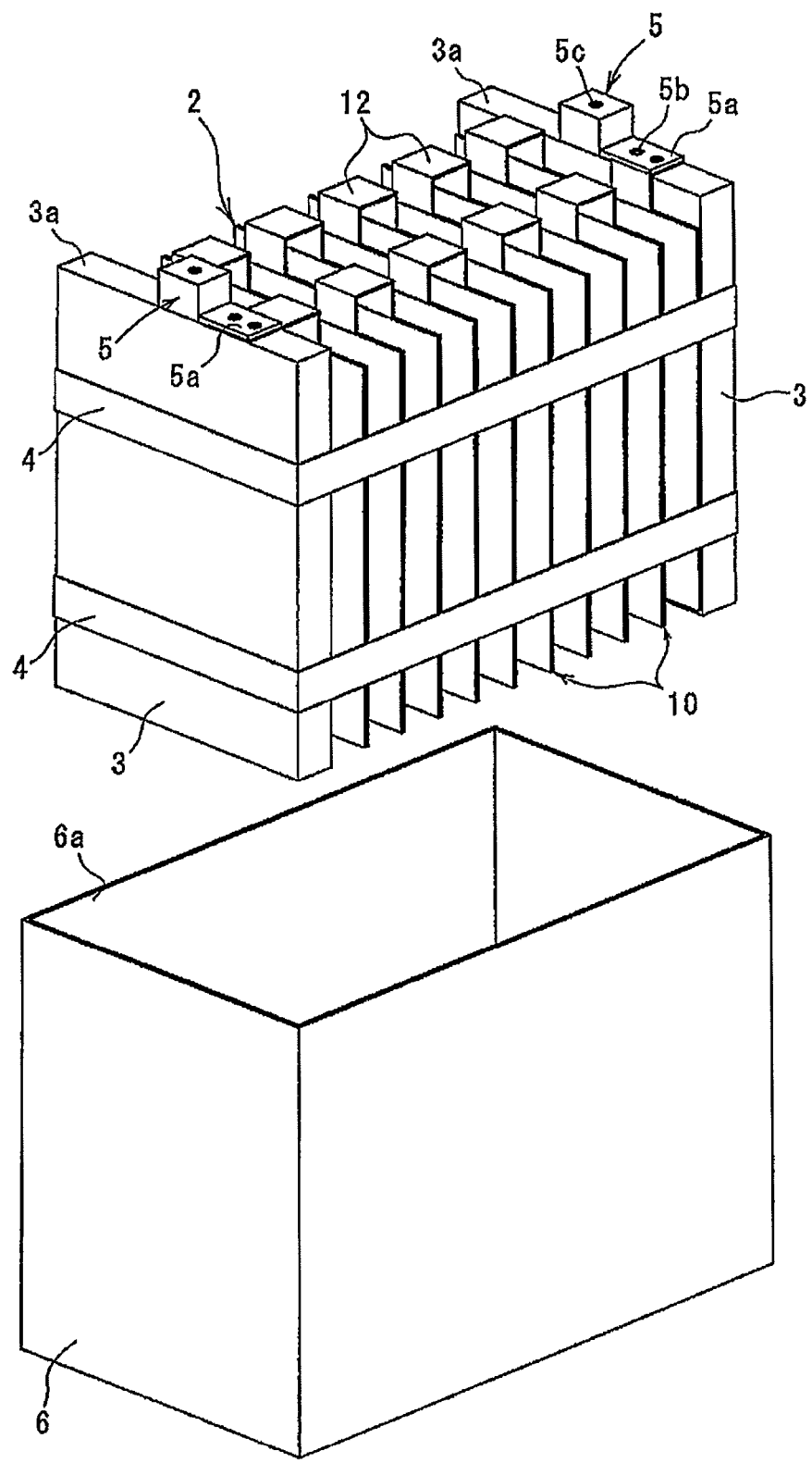
FIG. 2 is a perspective view, showing a capacitor module and a metallic case.

A plurality of capacitor cells 10, each of which is formed as shown in FIG. 1, are parallelly arranged as shown in FIG. 2, and the positive electrode-side lead terminal 12 of one of the adjacent capacitor cells 10 and 10 is connected to the negative electrode-side lead terminal 12 of the other of the adjacent capacitor cells to form the capacitor module 2 containing a plurality of capacitor cells 10 connected according to the series connection.

Also, as shown in FIG. 2, a pair of end plates 3, 3 are disposed both sides of the capacitor module 2 in the condition of contacting therewith, and for example, metallic bands 4, 4 are fit onto the capacitor module 2 and the end plates 3, 3 to bind the capacitor module 2 and a pair of end plates 3, 3 as an integral body. In addition to above, the end plate 3 is composed of a plate of an insulating resin such as, for example, an epoxy resin and the like having larger size than the capacitor cell 10, but it is not limited to the plate of the insulating resin such as an epoxy resin and the like, and plates formed of various types of materials may alternatively be employed. Also, while two bands 4 are fixed to be vertically spaced apart from each other in FIG. 2, a single band or three or more bands may alternatively be fixed.

Also, one end section of the external connecting terminal 5 is in contact with the upper end section 3*a* of the end plate 3, as shown in FIG. 2. The external connecting terminal 5 includes a flat connecting piece 5*a* formed in one end section thereof (bottom end-side) for providing connection to the lead terminal 12 of the capacitor cell 10. Also, two screw holes 5*b*, 5*b* are formed in the connecting piece 5*a*. While the lead terminals 12 of the adjacent capacitor cells 10 are inserted between the lower surface of the connecting piece 5*a* and the upper end surface 3*a* of the end plate 3, screw or the like is screwed from the screw hole 5*b* of the connecting piece 5*a* to the end plate 3 so that the lead terminal 12 is pinched between the connecting piece 5*a* and the upper end surface 3*a* of the end plate 3, the external connecting terminal 5 is electrically connected to the lead terminal 12, and the lead terminal 12 is fixed to the end plate 3. Also, the other end section of the external connecting terminal 5 (upper end-side) is formed to have the substantially cube shape so as to protrude upward from the end plate 3, and the screw hole 5*c* for connecting with external devices, parts, bus bars and the like is formed in the upper surface side thereof.

The capacitor module 2, a pair of end plates 3, 3, the bands 4, 4, and the external connecting terminals 5, 5, which are integrally formed, are housed in the metallic case 6 having the opening section 6*a* on the upper side as shown in FIG. 2, and the inside of the metallic case 6 is filled with the insulating resin 7 to form the electric double-layer capacitor 1.

Figure 3:
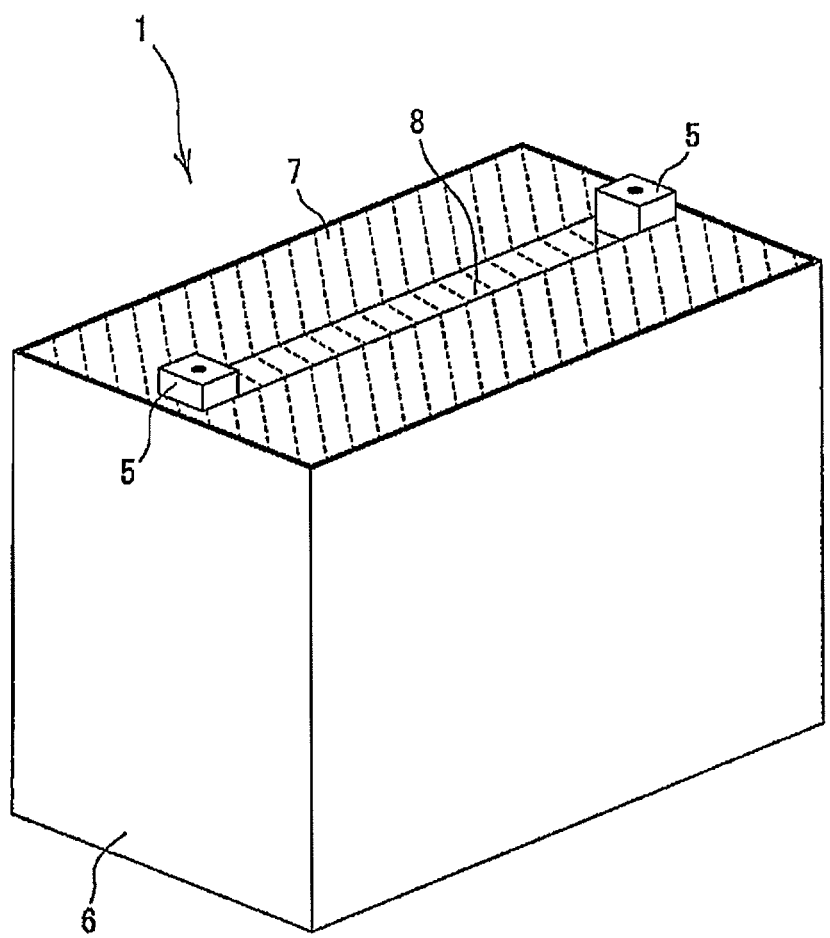
FIG. 3 is a perspective view, showing an electric double-layer capacitor.
Figure 4:
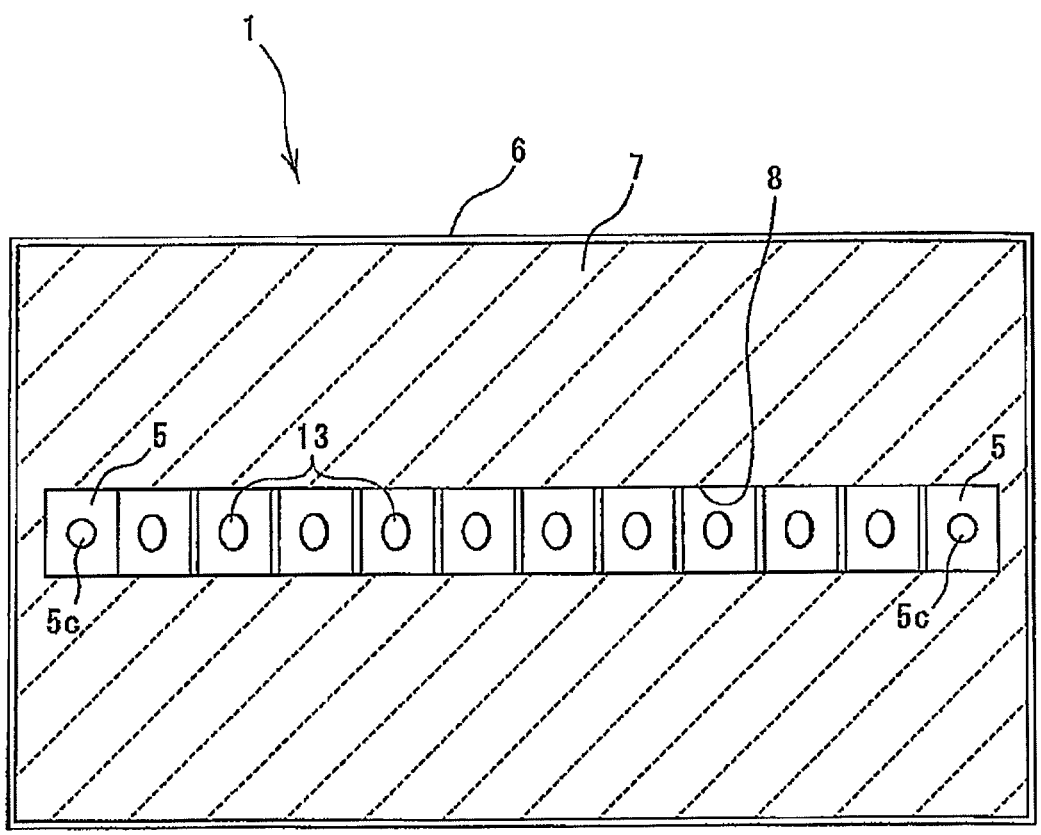
FIG. 4 is a plan view of the electric double-layer capacitor of FIG. 3.
Figure 5:
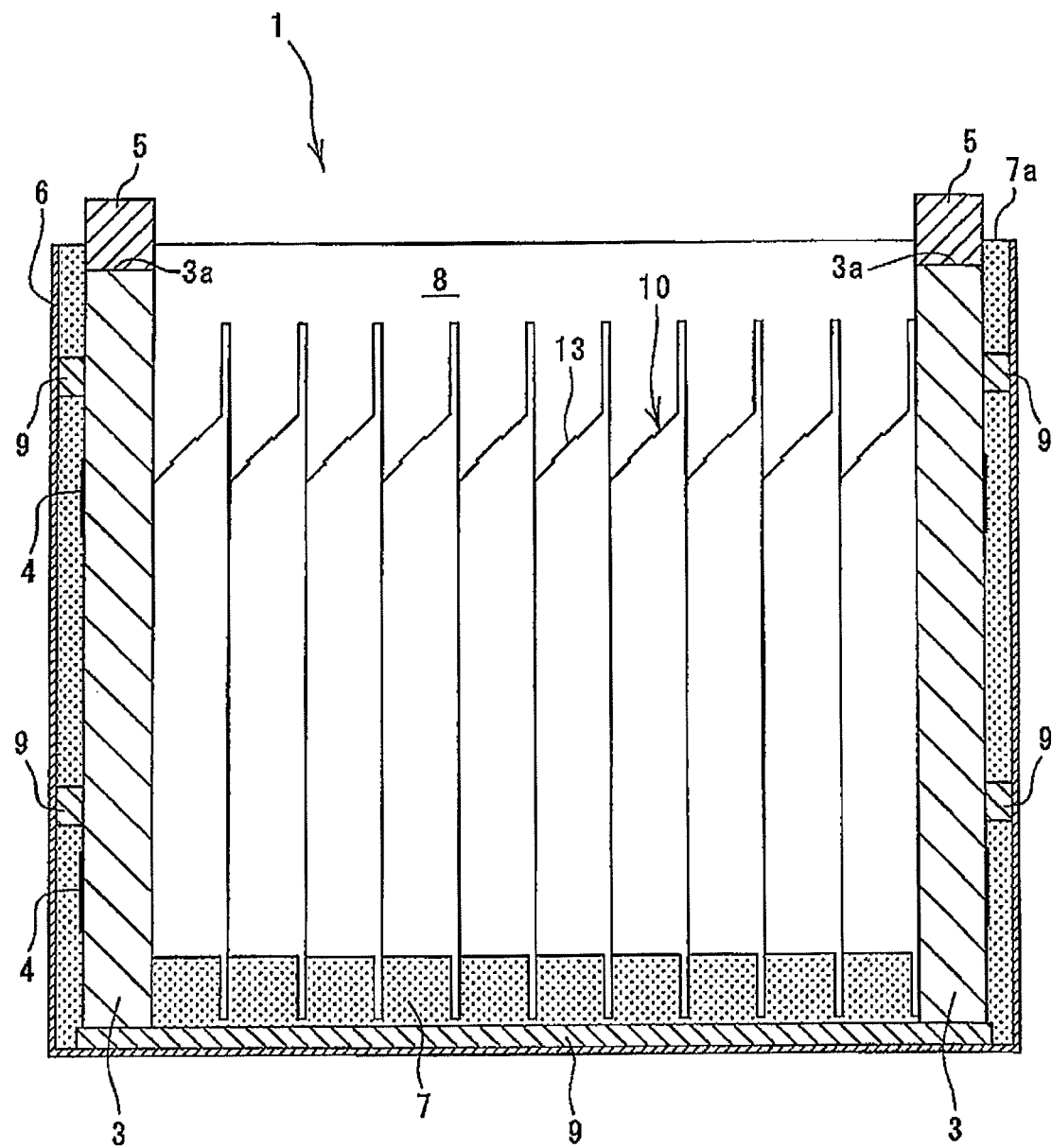
FIG. 5 is a cross-sectional view of the electric double-layer capacitor of FIG. 3.

More specifically, the insulating resin 7 is, for example, a urethane resin, and is employed to fill the case so that the entire capacitor cells 10 including the lead terminals 12 of the capacitor cells 10, a pair of end plates 3, 3, the bands 4, 4, and the bottom end-sides of the external connecting terminals 5, 5 are positioned under an insulating resin surface 7*a* except the upper portion of the gas discharge valve 13 of the capacitor cell 10, in other words, so as to form the gas discharge path 8 communicating the gas discharge valve 13 to the outside, as shown in FIG. 3 to FIG. 5. Therefore, the connecting section between the lead terminals 12, of the capacitor cells 10 and the connecting section between the lead terminal 12 and the external connecting terminal 5 are in the state to be covered with the insulating resin 7. While typical method for forming the gas discharge path 8 includes a method for providing a mold form so as to surround the gas discharge valve 13 before the filling of the insulating resin 7 to prevent the inflow of the insulating resin 7, other method may also be employed, and these methods may be suitably changed.

Figure 6:
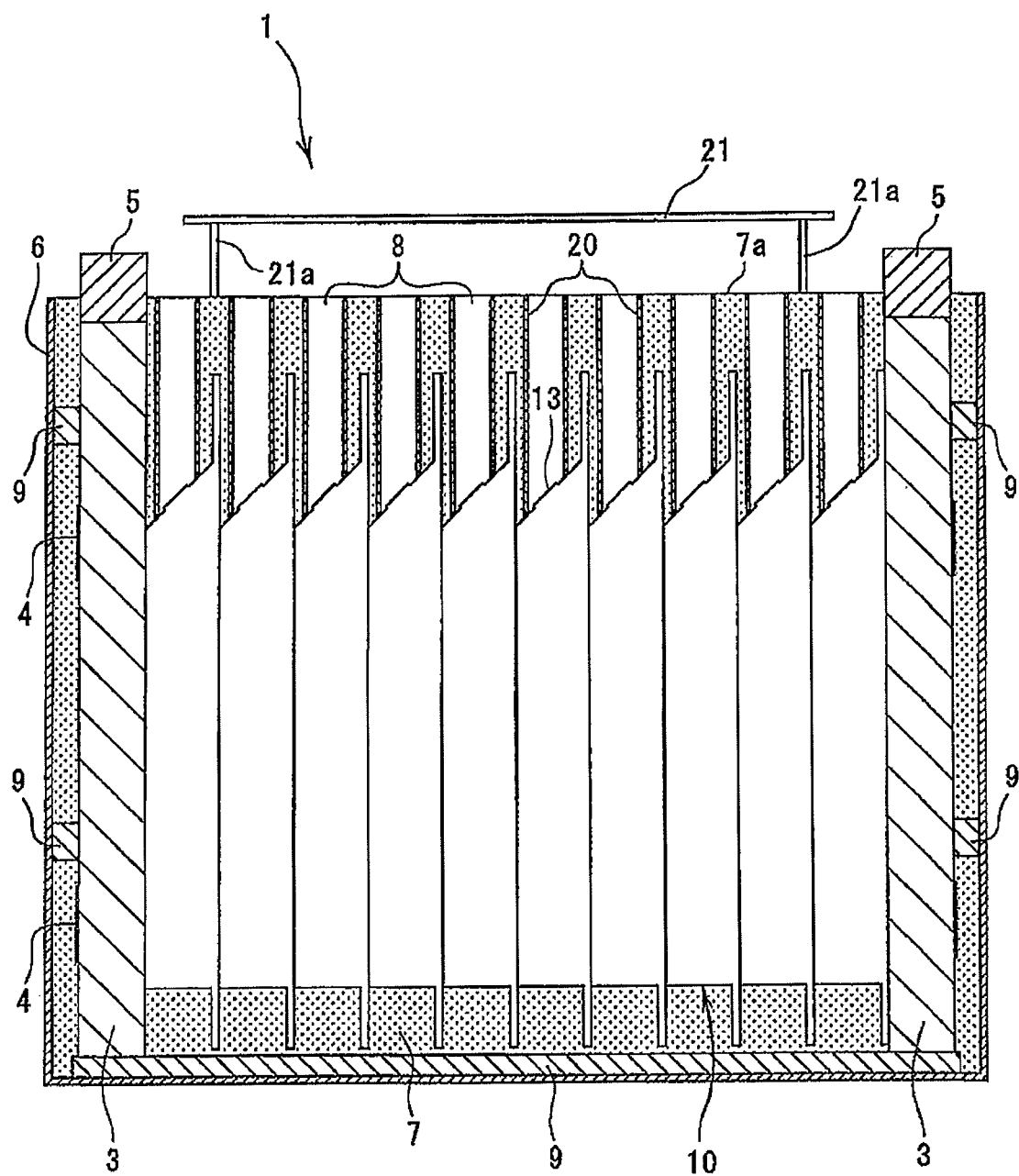
FIG. 6 is a cross-sectional view of an electric double-layer capacitor of a different embodiment.

Also, a spacer 9, which is in contact with the inside of the metallic case 6, is provided before the insulating resin 7 is filled in the metallic case 6. More specifically, the spacer 9 is, for example, of a bar made of glass epoxy, and is disposed between the end plate 3 and the metallic case 6 to form a space for forming the insulating resin layer between the inside of metallic case 6 and the end plate 3 as shown in FIG. 5 and FIG. 6. In addition to above, the spacer 9 may be previously fixed to the inside of the metallic case 6, or may be previously fixed to the end plate 3, or may be formed integrally with the end plate 3. More specifically, the spacer 9 may be provided so that a certain space is provided between the metallic case 6 and the member such as the capacitor cell 10, the end plate 3 and the like without making a contact between the metallic case 6 and the member to form the insulating resin layer having a sufficient thickness that can ensure the vibration resistance, the impact resistance and the heat release-ability. Also, the shape of the spacer 9 is not limited to the bar-shape, and suitable shape may be selected. Further, the material thereof is not limited to glass epoxy, and suitable material may be selected.

Since a plurality of capacitor cells 10, a pair of end plates 3, 3, and the bottom end sections of the external connecting terminals 5, 5 housed in the metallic case 6 are covered with the insulating resin 7, in fact, are supported (fixed) by the insulating resin 7 in the electric double-layer capacitor 1 having the configuration, this can prevent these members from exhibiting different behaviors thereby being mutually collided and so on. Also, the connecting section between the lead terminals 12 of the capacitor cells 10, and the connecting section between the lead terminal 12 and the external connecting terminal 5 are fixed by the insulating resin 7, so that failures caused by the vibration and the impact can be prevented. Further, since the external connecting terminal 5 is mounted to the end plate 3 fixed by the insulating resin 7, influences due to the vibration and the impact can be reduced, even if the upper end-side thereof protrudes from the insulating resin 7. Also, since the insulating resin 7 functions as a heat transfer material, and the case 6 is made of the metallic material, this exhibits enhanced heat release-ability. Also, since relatively flexible urethane resin is employed for the insulating resin 7, this can follow the expansion and the shrinkage of the capacitor cell 10, and this can also be employed up to around 80 degrees C., so that this can be resistant to the heat generated from the capacitor cell 10 or the heat from the outside. Also, since this exhibits an elastic property, the vibration and the impact can be absorbed to provide improved vibration resistance and improved impact resistance.

Also, since the gas discharge path 8 is provided, the discharge of the gas can be smoothly conducted. Also, since the spacer 9 is provided, the insulating resin layer can be firmly formed between the metallic case 6 and the capacitor cell 10 or the end plate 3 to ensure the vibration resistance, the impact resistance and the heat release-ability and the alignment of the capacitor cells 10 or the end plates 3 in the metallic case 6 can be easily achieved, so that the assembly operation becomes facilitated.

While the specific embodiment of the present invention has been described above, the present invention is not limited to the descriptions of the aforementioned embodiment, and various types of modifications may be made thereto within the spirit and scope of the present invention. For example, while the urethane resin is employed for the insulating resin 7 in the above embodiment, this is not limited to the urethane resin, and other types of resins such as a silicon resin and the like or a rubber may alternatively be employed. In such a case, improved heat release-ability and improves impact absorbing-ability can be achieved by the characteristics of the resin.

Also, a tubular member 20 may be disposed before filling the insulating resin 7, in which, in the state in which one-side (bottom end-side) of the tubular member is disposed to face the gas discharge valve 13, the other-side (upper end-side) of the tubular member is positioned to be at the same height to or to be higher than the height of the insulating resin surface 7a as shown in FIG. 6, and thereafter the insulating resin 7 may be filled to form the gas discharge path 8. In such a case, there is an advantage that the operation for filling the insulating resin 7 is simplified. In addition to above, this tubular member 20 may be pulled out from the insulating resin 7 after the resin is cured.

Also, a control board 21 for controlling the voltage of the respective capacitor cells 10 may be disposed in the side of the opening section 6a of the metallic case 6 and on the insulating resin surface 7a as shown in FIG. 6. In such a case, the control board 21 is fixed by, for example, burying a leg section 21a of the control board 21 in the insulating resin 7. As described above, the control board 21 is fixed through the insulating resin 7, so that, when a vibration or an impact is exerted from the outside, the vibration or the impact is not directly reached to the control board 21 but reached through the insulating resin 7 to cause the behaviors that are substantially equivalent to the other members, and therefore an advantageous effect of inhibiting the failure of the control board 21 or the wire (not shown) for connecting the control board 21 with the capacitor cell 10 or the like can be achieved. In addition to above, it is not limited to employ the insulating resin 7 for fixing the control board 21, the member covered with the insulating resin 7 such as the end plate 3 and the like may be employed.

REFERENCE SIGNS LIST 1 electric double-layer capacitor
3 end plate
5 external connecting terminal
6 metallic case
7 insulating resin
7a insulating resin surface
8 discharge path
9 spacer
10 capacitor cell
11 exterior case
12 lead terminal
13 discharge valve
20 tubular member
21 control board

The invention claimed is:

1. An electric double-layer capacitor, comprising:
   capacitor cells, in each of which a positive electrode and a negative electrode, and a separator interposed therebetween, are housed in an exterior case that is filled with an electrolytic solution, and lead terminals, connected to the positive electrode and the negative electrode, respectively, are drawn to the outside of the exterior case;
   a pair of end plates, respectively disposed on both sides of a plurality of parallelly arranged capacitor cells;
   a metallic case for housing the end plates, and the plurality of capacitor cells; and
   an insulating resin, filling the interior of the metallic case to cover the end plates, the plurality of capacitor cells and the lead terminals,
   wherein the electric double-layer capacitor further comprises an external connecting terminal having two end sections, one of the end sections being disposed in the end plate within the insulating resin, and the other of the end sections protruding from the insulating resin toward the outside thereof, and
   wherein the lead terminal of the capacitor cell disposed adjacent to the end plate is configured to be connected to the one of the end sections of the external connecting terminal and be fixed to the end plate in a state that a connecting section therebetween is covered with the insulating resin.

2. The electric double-layer capacitor according to claim 1, wherein the exterior case includes a discharge valve for discharging a gas generated in the inside of the capacitor cell to the outside thereof, and
   wherein the insulating resin fills the interior of the metallic case so as to form a discharge path for communicating the discharge valve to the outside thereof.

3. The electric double-layer capacitor according to claim 2, wherein the discharge path is composed of a tubular member provided so as to face the discharge valve.

4. The electric double-layer capacitor according to claim 1, wherein
   a control board for controlling voltage of each of the capacitor cells is provided above the insulating resin in the side of an opening section of the metallic case.

5. The electric double-layer capacitor according to claim 1, wherein a spacer being in contact with the inside of the metallic case is provided.

6. An electric double-layer capacitor, comprising:
   capacitor cells, in each of which a positive electrode and a negative electrode, and a separator interposed therebetween, are housed in an exterior case that is filled with an electrolytic solution, and lead terminals, connected to the positive electrode and the negative electrode, respectively, are drawn to the outside of the exterior case;
   a pair of end plates, respectively disposed on both sides of a plurality of parallelly arranged capacitor cells;
   a metallic case for housing the end plates, and the plurality of capacitor cells; and
   an insulating resin, filling the interior of the metallic case to cover the end plates, the plurality of capacitor cells and the lead terminals,
   wherein:
   the electric double-layer capacitor further comprises an external connecting terminal having two end sections, one of the end sections being disposed in the end plate within the insulating resin, and the other of the end sections protruding from the insulating resin toward the outside thereof,
   the lead terminal of the capacitor cell disposed adjacent to the end plate is configured to be connected to the one of the end sections of the external connecting terminal and be fixed to the end plate,
   the exterior case includes a discharge valve for discharging a gas generated in the inside of the capacitor cell to the outside thereof, and
   the insulating resin fills the interior of the metallic case so as to form a discharge path for communicating the discharge valve to the outside thereof.

7. The electric double-layer capacitor according to claim 6, wherein the discharge path is composed of a tubular member provided so as to face the discharge valve.

8. The electric double-layer capacitor according to claim 6, wherein a control board for controlling voltage of each of the capacitor cells is provided above the insulating resin in the side of an opening section of the metallic case.

9. The electric double-layer capacitor according to claim 6, wherein a spacer being in contact with the inside of the metallic case is provided.

* * * * *